United States Patent
Lee et al.

(10) Patent No.: US 9,093,069 B2
(45) Date of Patent: Jul. 28, 2015

(54) PRIVACY-SENSITIVE SPEECH MODEL CREATION VIA AGGREGATION OF MULTIPLE USER MODELS

(71) Applicant: Nuance Communications, Inc., Burlington, MA (US)

(72) Inventors: Antonio R. Lee, Yorktown Heights, NY (US); Petr Novak, Prague (CZ); Peder Andreas Olsen, Yorktown Heights, NY (US); Vaibhava Goel, Yorktown Heights, NY (US)

(73) Assignee: Nuance Communications, Inc., Burlington, MA (US)

( * ) Notice: Subject to any disclaimer, the term of this patent is extended or adjusted under 35 U.S.C. 154(b) by 220 days.

(21) Appl. No.: 13/668,662

(22) Filed: Nov. 5, 2012

(65) Prior Publication Data

US 2014/0129226 A1 May 8, 2014

(51) Int. Cl.
| | | |
|---|---|---|
| G10L 15/06 | (2013.01) | |
| G10L 15/00 | (2013.01) | |
| G10L 15/04 | (2013.01) | |
| G10L 15/065 | (2013.01) | |
| G06F 21/78 | (2013.01) | |

(52) U.S. Cl.
CPC .............. *G10L 15/04* (2013.01); *G06F 21/78* (2013.01); *G10L 15/065* (2013.01)

(58) Field of Classification Search
USPC .................. 704/231–257, 270–275
See application file for complete search history.

(56) References Cited

U.S. PATENT DOCUMENTS

| | | | |
|---|---|---|---|
| 6,484,136 B1 * | 11/2002 | Kanevsky et al. ............. 704/9 |
| 7,162,414 B2 * | 1/2007 | Stanford ..................... 704/201 |
| 7,219,058 B1 * | 5/2007 | Rose et al. ................... 704/238 |
| 8,473,451 B1 * | 6/2013 | Hakkani-Tur et al. ....... 707/602 |
| 2002/0147579 A1 * | 10/2002 | Kushner et al. ............. 704/207 |
| 2003/0036903 A1 | 2/2003 | Konopka et al. |
| 2003/0088421 A1 * | 5/2003 | Maes et al. ................ 704/270.1 |
| 2004/0181670 A1 * | 9/2004 | Thune et al. ................. 713/176 |
| 2004/0230424 A1 * | 11/2004 | Gunawardana .............. 704/219 |
| 2006/0190263 A1 * | 8/2006 | Finke et al. ................... 704/270 |
| 2009/0063144 A1 * | 3/2009 | Rose et al. ................... 704/236 |

OTHER PUBLICATIONS

Boyd et al., Distributed Optimization and Statistical Learning via the Alternating Direction Method of Multipliers. Foundations and Trends in Machine Learning. 2010;3(1):1-122.

(Continued)

*Primary Examiner* — Jesse Pullias
(74) *Attorney, Agent, or Firm* — Wolf, Greenfield & Sacks, P.C.

(57) ABSTRACT

Techniques disclosed herein include systems and methods for privacy-sensitive training data collection for updating acoustic models of speech recognition systems. In one embodiment, the system locally creates adaptation data from raw audio data. Such adaptation can include derived statistics and/or acoustic model update parameters. The derived statistics and/or updated acoustic model data can then be sent to a speech recognition server or third-party entity. Since the audio data and transcriptions are already processed, the statistics or acoustic model data is devoid of any information that could be human-readable or machine readable such as to enable reconstruction of audio data. Thus, such converted data sent to a server does not include personal or confidential information. Third-party servers can then continually update speech models without storing personal and confidential utterances of users.

20 Claims, 5 Drawing Sheets

(56) References Cited

OTHER PUBLICATIONS

Pathak et al., Privacy Preserving Probabilistic Inference with Hidden Markov Models. Mitsubishi Electric Research Laboratories. 2011. Available at http://www.merl.com/reports/docs/TR2011-017.pdf. 6 pages.

Smaragdis et al., A Framework for Secure Speech Recognition. IEEE Transactions on Audio, Speech, and Language Processing. 2007;15(4):1404-13.

* cited by examiner

PRIVACY-SENSITIVE SPEECH MODEL CREATION VIA AGGREGATION OF MULTIPLE USER MODELS

BACKGROUND

The present disclosure relates to speech recognition, and particularly to speech recognition providing voice-activated/voice command functionality, and voice query functionality.

Speech recognition, or automatic speech recognition, involves a computerized process that identifies spoken words. There are many uses for speech recognition, including speech transcription, speech translation, ability to control devices and software applications by voice, call routing systems, voice search of the Internet, etc. Speech recognition systems can optionally be paired with spoken language understanding systems to extract meaning and/or commands to execute when interacting with systems.

Speech recognition systems are highly complex and operate by matching an acoustic signature of an utterance with acoustic signatures of words. This matching can optionally be in combination with a language model. Thus, both acoustic modeling and language modeling can be used in the speech recognition process. Acoustic models can be created from audio recordings of spoken utterances as well as associated transcriptions. The acoustic model then defines statistical representations of individual sounds for corresponding words. A speech recognition system uses the acoustic model to identify a sequence of sounds, while the speech recognition system uses the language model to identify possible word sequences from the identified sounds.

Speech recognition providing voice-activated or voice command functionality enables speakers to control devices and systems by speaking various instructions or queries. For example, a speaker can utter a command to execute a specific task, or utter a query to retrieve specific results. Spoken input can follow a rigid set of phrases that perform specific tasks, or spoken input can be natural language, which is interpreted by a natural language unit of a speech recognition system. Voice command functionality is becoming increasingly popular on portable devices, especially battery-powered portable devices such as cell phones, laptops, and tablet computers.

SUMMARY

The performance of a speech recognition system is highly dependent on the quality of the acoustic model used by a speech recognizer. To build the best acoustic model (AM) possible, it is beneficial to have acoustic data from the users of the system to train the system. Training data is typically collected by capturing audio data and transcriptions from the field, that is, recording actual queries and commands from speakers. One way this is accomplished in server-based speech recognition cell phone applications (such as those available for the iPhone and Android platforms) is to save users' audio data that is sent to speech recognition servers as part of the recognition request. Data from individual users is then combined with the data from other users and aggregated for training or updating acoustic models of the server-based speech recognition system. Thus, third-party systems can collect audio and transcriptions from the utterances of millions of users.

The problem with this approach of collecting training data is that third-party entities save personal information (such as social security numbers, personal identification numbers, medical conditions, etc.) and other confidential information. Because of this privacy concern, such a data collection approach may require a user's permission to use or store the data, which permission may be difficult to acquire because of increasing security and privacy concerns. Moreover, such permission may essentially be impossible to acquire from many users.

Techniques disclosed herein include systems and methods for privacy-sensitive training data collection for updating acoustic models of speech recognition systems. In other words, systems herein can collect training data for updating speech models by modified data in such a way that the modified data cannot be used to reconstruct raw utterances, or original messages contained therein, by human or machine. In one embodiment, the system herein builds models, not from the users' original audio data, but instead from locally-processed user data. This locally-processed audio data can then be sent as derived statistics or as an updated acoustic model (or compressed versions thereof) to a speech recognition server. Since the audio data and transcriptions are already processed and discarded, the statistics or acoustic model data does not contain such audio or transcriptions and thus is devoid of any information that could be human-readable or machine readable. This means that privacy concerns are diminished since each user does not need to agree to save the audio data remotely or at third-party servers because no personal information is being sent—only derived statistics or acoustic parameters are being sent.

The processed data or adaptation data can be a version of the acoustic model used at the server, except only containing information from a single user. At the server end, the acoustic models from multiple users can then be combined to build an improved acoustic model. By using an algorithm like ADMM (Alternating Direction Method of Multipliers) or similar processes, the method has a foundation that ensures the objective function is maximized (objective can be maximum likelihood or a discriminative objective) and that relatively little is lost over not having direct access to the audio data.

One embodiment includes a privacy manager that executes a speech recognition process or system. The privacy manager (or associated device) receives a spoken utterance, such as a voice command to execute a task or a voice query to retrieve information. The privacy manager stores audio data from the spoken utterance at a first-party device. This first party device can be a personal device of a speaker, an associated desktop computer, or even a first-party privacy-protected server. The privacy manager creates adaptation data from the audio data via processing at the first-party device. This adaptation data is generated in a format that prevents reconstruction of the audio data such that the adaptation data is not human-readable or machine readable in a manner that enables recreating audio data, thus sensitive or confidential information is protected. Such adaptation data can include derived statistics or an updated acoustic model. The privacy manager then transmits the adaptation data to a third-party server, where this privacy-protected data can be aggregated with statistical data from other users to improve a general or group-specific acoustic model. Thus, shared general acoustic models can be continually updated without storing personal and confidential audio data on third-party systems.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a spoken utterance; storing audio data from the spoken utterance at a first-party device; creating adaptation data from the audio data via processing at the first-party device, the adaptation data being in a format that prevents reconstruction of the audio data; and transmitting the adaptation data to a third-party server. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations.

As discussed above, techniques herein are well suited for use in software applications supporting speech recognition and privacy protection. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
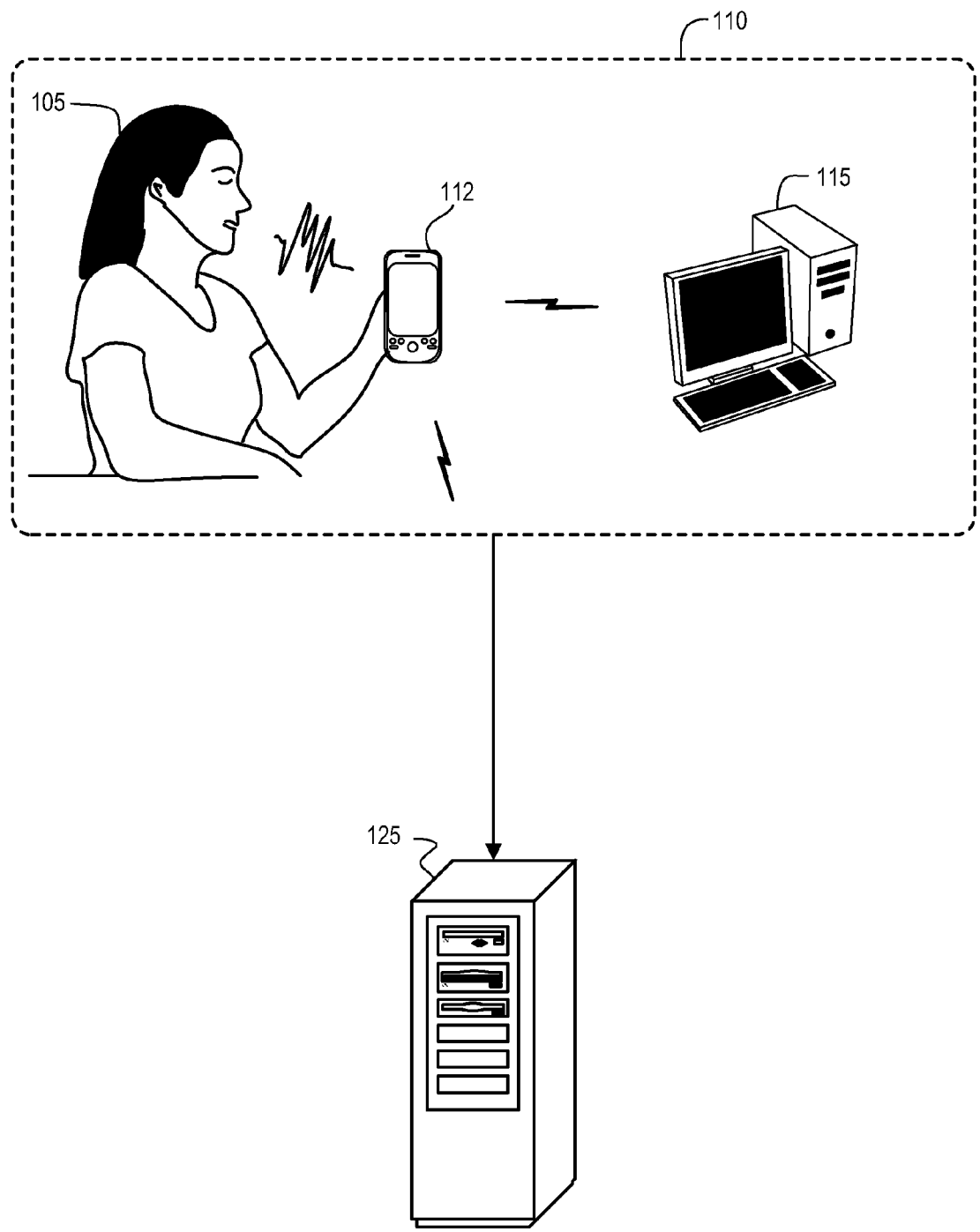
FIG. 1 is a block diagram of a system for privacy-sensitive speech model creation according to embodiments herein.

Techniques disclosed herein include systems and methods for privacy-sensitive training data collection for updating acoustic models of speech recognition systems. In one embodiment, the system herein builds models, not from the users' original audio data, but instead from locally-processed user data. This locally-processed audio data can then be sent as derived statistics or as an updated acoustic model (or compressed versions thereof) to a speech recognition server. Since the audio data and transcriptions are already processed and discarded, the statistics or acoustic model data does not include such audio or transcriptions, and thus is devoid of any information that could be human readable or readable by a machine in a way that enables reconstruction of audio or transcriptions. This means that privacy concerns are diminished since each user does not need to agree to save the audio data remotely or at third-party servers, and audio data does not need to be stored at third-party servers. The processed data or adaptation data can be a version of the acoustic model used at the server, but only containing information from a single user. Thus, shared general acoustic models can be continually updated without storing personal and confidential audio data on third-party systems for training.

In general, the system functions in the context of speech recognition applications operating on user devices, such as cell phones, car navigation systems, tablet computers, etc. Each time an application user speaks into the system, an underlying software program can run to save the audio data (or some derived statistics) and transcription (returned by the server) on the local cell phone or device. Either then or after a pre-defined number of utterances has been saved, the software program initiates a series of algorithms that convert the saved audio data into an acoustic model or a statistical representation of the audio data. Collectively, the result of the data conversion is referred to as adaptation data. This acoustic model or adaptation data can then be transmitted back to the server (optionally via prompting from the speech application) to be further processed. Such further processing can use the derived statistics to change the parameters of a corresponding acoustic model. The local acoustic model building can be relatively sophisticated, though perhaps not as intensive as processing possible on the server side. The system can optionally send a compressed version of the adaptation data if size of the acoustic model is an issue (in terms of storage or transmission size). Alternatively, the system can derive adaptation data by comparing new audio data to a previous acoustic model, and then send only components with relatively large differences. After sending the adaptation data to the server, the server can aggregate the adaptation data or aggregate the multiple acoustic models into a single acoustic model. This acoustic model can then be further refined or used as-is for speech recognition.

Referring now to FIG. 1, a block diagram illustrates a user 105 speaking an utterance, such as a command or query. This utterance is received by client device 112, which can be a cell phone, tablet computer, automobile, or other computer system. Box 110 designates a local area or network, or rather, a first-party network or environment. Computer 115 can be embodied a desktop computer in a home or office, or alternatively embodied as a first-party server or other trusted secure server. Server 125 is then a remote or third-party server. Server 125 receives raw audio data for the purpose of speech recognition and execution, but then discards the raw audio data. Audio data and transcription files are then stored locally (box 110) for statistical processing to generate adaptation data. This adaptation data, or a portion thereof, is then forwarded to third-party server 125 as privacy-protected data, that is, data that does not contain confidential information or has been statistically modified to an extent that reconstruction of original data is practically not possible.

The adaptation data can optionally include derived statistics, acoustic model updates, or other converted forms of the audio data functional for updating speech models. Considering the option of sending updated model information or updated statistics, if the model is already updated on the user device, then the provider does not need a large infrastructure for building the model because this is completed on the user side. The third-party server would need less hardware when models are updated on the user side. One option is to send the statistics and then do the processing on the server side. Another option is to update the models on the client side, and then send the model updates so the server-side processing is just needed to combine all of the models without additional processing.

There are various embodiments of the privacy-sensitive speech model creation as disclosed herein. In one embodiment, each individual user collects its own data for training. Thus, the user's audio files and related files would not be kept at the server, but instead would be kept locally at the client device, such as at a personal wireless client device or desktop computer synchronized with that device. Once a sufficient amount of data is collected, this collected data can be converted to adaptation data that can be characterized as being in a form that is no longer human-recognizable or human-readable. This form is also no longer readable by a machine to reconstruct transcriptions, words, original messages, sound files, and the like. Basically, a person would no longer be able to listen to the audio data or read a transcription of respective utterances. This converted data is then sent to a collection server instead of sending actual audio files and related files. The server can then aggregate this converted data with similar data from additional users to build a larger model, aggregate model, or to update a current model. This could be a general model, user-specific model, or user-group specific model. For example, a user-group specific model could be a model used for a particular hospital, company, or demographic of users.

With privacy policies supported herein, it is acceptable to have data residing in these secure locations (first-party devices). Optionally, the system does not send updates to a third-party server, but instead uses the data to locally update the model with either minor or major updating. By way of a non-limiting example, this updating could happen within smart phones, associated desktop computers, or even local servers. Local servers would not be third-party servers but servers associated with, or provided by, a first party (such as a company server or user-group server). Thus, all voice recognition/command/natural language interface interactions would be stored at this first-party server. Accordingly, the third-party server would not store the audio and transcription files. With the audio data stored locally, this data can be used to update the model locally and with a high-level of privacy. Updates generated at client devices can then be simply aggregated at a server thus providing the benefit of distributed computing.

Note that the third party server—used for speech recognition and natural language understanding—notwithstanding privacy concerns needs to analyze the raw audio data to be able to recognize text and identify user intent. The third party server administration or provider, however, typically agrees not to save the audio data or has no permission to save the audio data. The raw data would then be used simply for voice command recognition, natural language understanding, or otherwise handled, and then discarded after such recognition. This way such voice-based personal assistant programs can be used freely, acoustic/language models can be updated continuously, and all without having sensitive data stored on third-party servers. Without a third-party acoustic model user saving data, the third party acoustic model would most likely not get updated. Updating, according to embodiments herein, is thus still possible. Updating acoustic models is important to continually improve accuracy of recognition.

Note that a distinction can be made between the recognition processing and the model update processing. Recognition is typically an online/real time process, while model updating is typically an offline/subsequent process, though sometimes updating can be in real time. For recognition, audio is sent to the server as this is necessary for speech recognition, but this transmitted audio is not stored for later training purposes. The audio data is transmitted, recognized, and then discarded. In other scenarios recognition is executed on the device itself, and thus raw audio does not need to be transmitted from the local device to any server. Generally, speech recognition can be more accurate when recognized using more powerful processing computers and models. This means that speech recognition is often more accurate when executed by a server rather than a personal device. This is especially true for open-ended tasks and questions, though personal device recognition can be highly accurate for constrained tasks. Thus, both client-based and server-based recognition systems are available and can be used with embodiments herein. In systems where recognition is executed on the device, there still can be a centralized process for executing the update. Those updates can then be returned to individual devices for improved recognition accuracy. Such updates can also be based on input from multiple users. That is, individual statistics can be collected from multiple users, processed together to update a single acoustic model, and then updates can be sent to individual devices for model updates.

In some embodiments, participating in the updating programs can be an opt-in selection in which users need to specifically permit use of their utterances to be locally collected and for local creation of acoustic model updates to send to a third-party server.

Techniques herein can operate in Wi-Fi or cellular transmission modes. For example, whether a mobile device is connected via cellular network link or Wi-Fi, the audio data can first be transmitted to a local server before being transmitted to a third-party server. Alternatively, the audio data is simultaneously sent to a third-party server and a local or first-party server. The third-party server does not save the audio data but only uses the data for recognition before discarding the data. In some embodiments, the third-party server can return transcriptions prior to discarding the data. At the local server the audio data can be stored, processed into statistical data, and then later aggregated with data from other users, groups, locations, etc.

Reconstructing adaptation data from a single utterance into raw data is difficult. This difficulty increases substantially as the amount of audio data used to create the adaptation data increases. In other words, the more utterances used to generate the statistical data, the more difficult it is to reconstruct original utterances. This is because the original audio and transcriptions are not being sent, but instead what is sent could be model parameters or statistical information, or an acoustic model itself, and so any original wording is essential not recoverable.

In some embodiments, the system can execute a discriminative update to the acoustic model. For example, the system can be configured to update only the states that have changed. Such discriminative updating can further enhance privacy of the adaptation data. Alternatively, the system can randomly select a subset of utterances and make random selections and throw away remaining parts, that way if a third-party is actually able to reconstruct utterances, any given utterance will be missing parts and thus unintelligible. Such subset selection can include selecting a portion of a single utterance or a portion of utterances from a collection of utterances.

Figure 5:
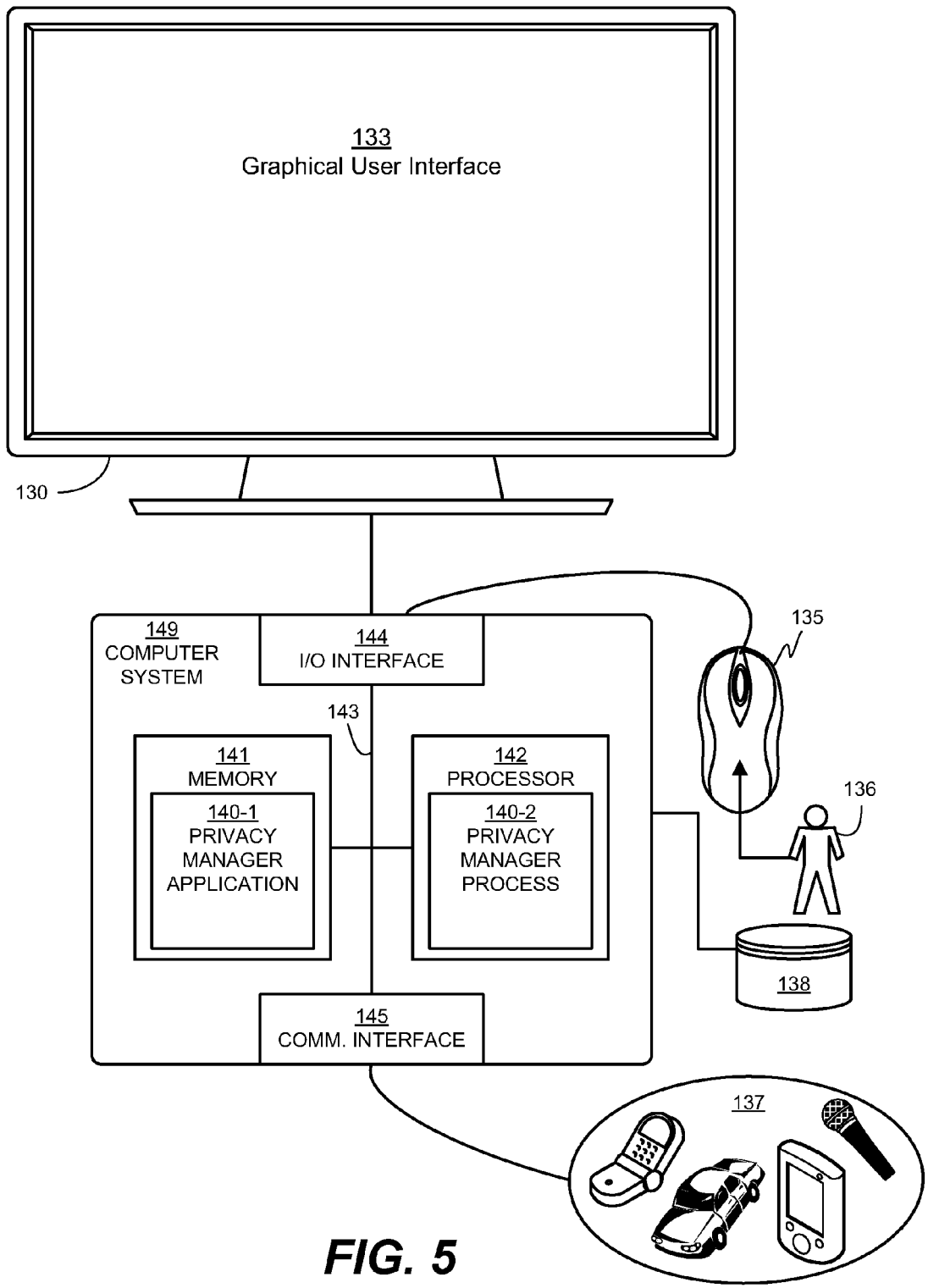
FIG. 5 is an example block diagram of a speech recognition privacy manager operating in a computer/network environment according to embodiments herein.

FIG. 5 illustrates an example block diagram of a privacy manager 140 operating in a computer/network environment according to embodiments herein. In summary, FIG. 5 shows computer system 149 displaying a graphical user interface 133 that provides a speech recognition interface. Computer system 149 can function as a client device such as a cell phone. Computer system 149 can connect to a remote server for processing assistance. Computer system hardware aspects of FIG. 5 will be described in more detail following a description of the flow charts.

Functionality associated with privacy manager 140 will now be discussed via flowcharts and diagrams in FIG. 2 through FIG. 4. For purposes of the following discussion, the privacy manager 140 or other appropriate entity performs steps in the flowcharts.

Figure 2:
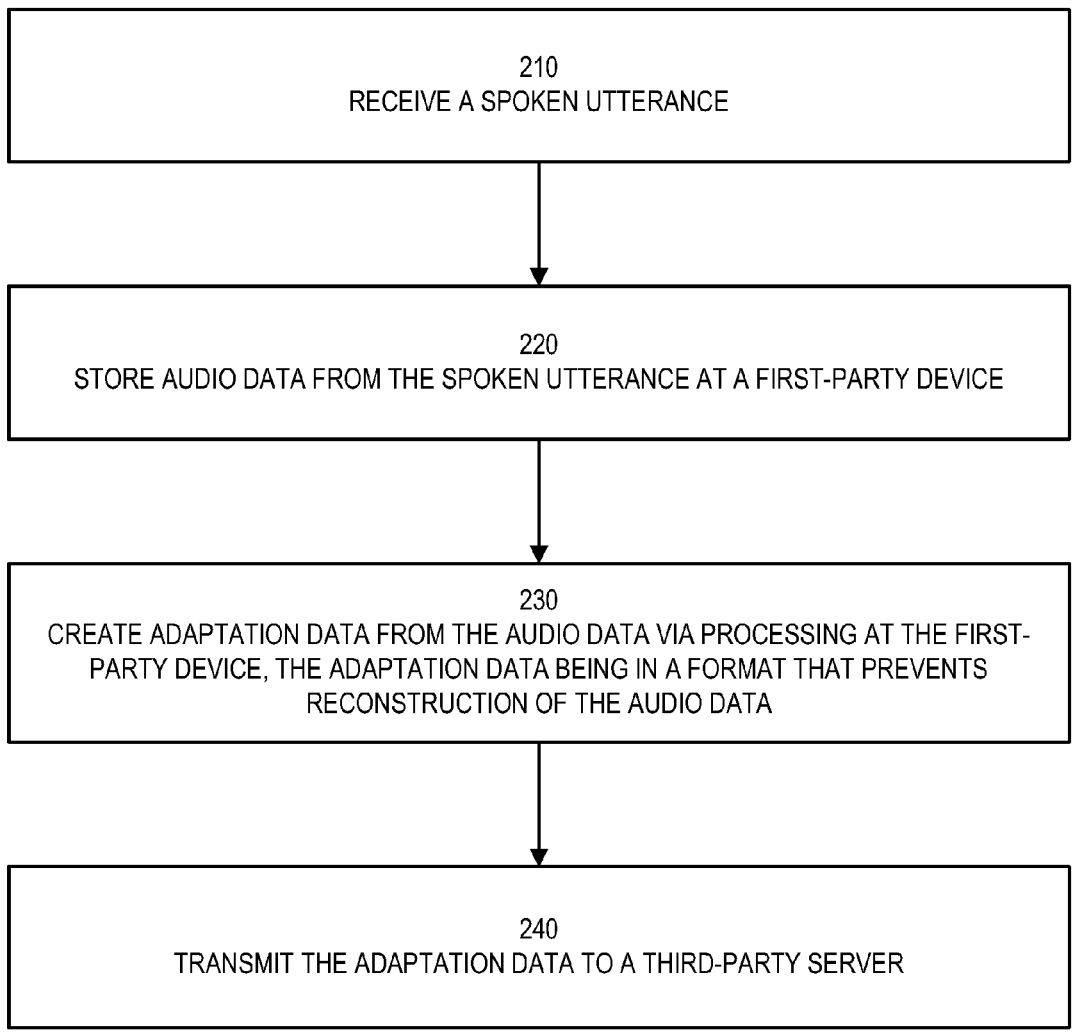
FIG. 2 is a flowchart illustrating an example of a process supporting privacy-sensitive speech model creation according to embodiments herein.

Now describing embodiments more specifically, FIG. 2 is a flow chart illustrating embodiments disclosed herein. In step 210, the privacy manager or client device receives a spoken utterance. This can be a voice query or voice command or other spoken instructions.

In step 220, the privacy manager stores audio data from the spoken utterance at a first-party device. This first-party device can include the client device itself (originally recording raw audio), or an associated network computer.

In step 230, the privacy manager creates adaptation data from the audio data via processing at the first-party device. The adaptation data is in a format that prevents reconstruction of the audio data. Thus, the privacy manager converts the audio data into a form of data that is privacy protective.

In step 240, the privacy manager transmits the adaptation data to a third-party server. The third-party server can then use this adaptation data—free of personal or confidential information—for updating speech models.

Figure 3:
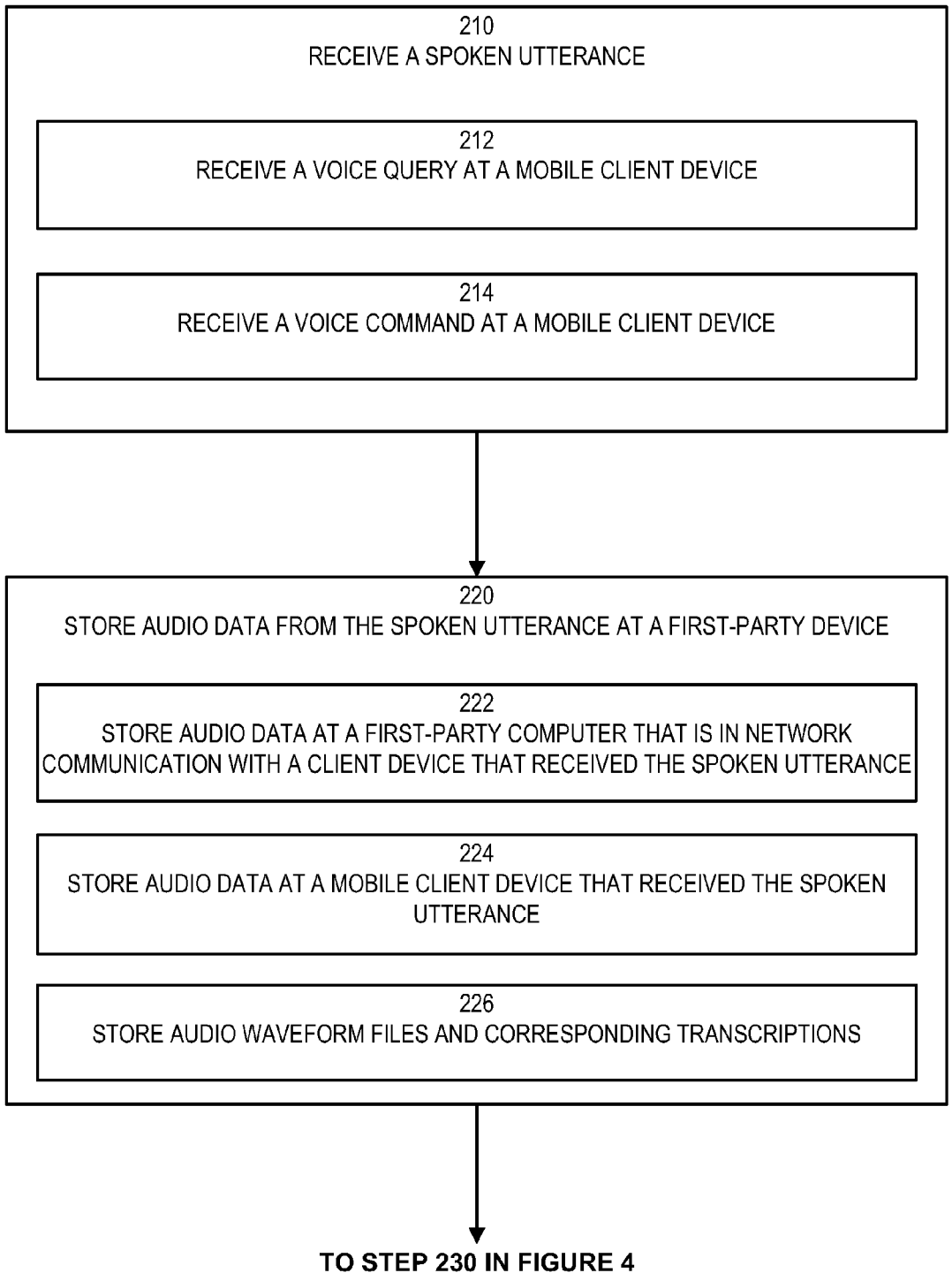
FIGS. 3-4 are a flowchart illustrating an example of a process supporting privacy-sensitive speech model creation according to embodiments herein.
Figure 4:
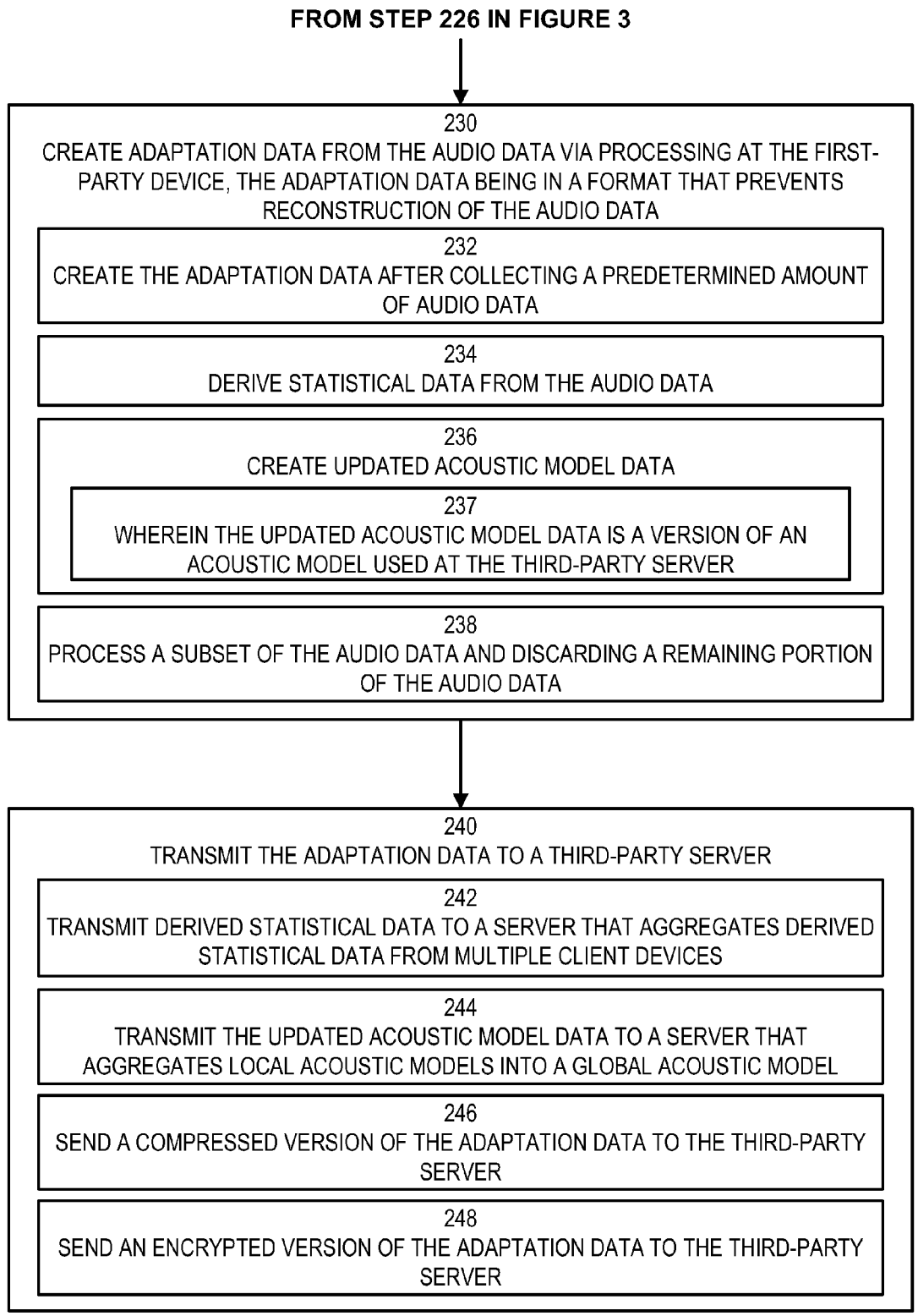

FIGS. 3-4 include a flow chart illustrating additional and/or alternative embodiments and optional functionality of the privacy manager 140 as disclosed herein.

In step 210, the privacy manager receives a spoken utterance.

In step 212, the privacy manager receives a voice query at a mobile client device, such as a cell phone, smart phone, tablet computer, etc. The voice query can be an open voice search, such as searching in a general search engine, or a more device specific search, such as for contacts or media.

In step 214, the privacy manager receives a voice command at a mobile client device. The voice command can be instructions to execute a task, establish a calendar item, launch a particular application, etc.

In step 220, the privacy manager stores audio data from the spoken utterance at a first-party device.

In step 222, the privacy manager stores audio data at a first-party computer that is in network communication with a client device that received the spoken utterance. Such a networked computer can be a desktop computer, company server, or other trusted computer.

In step 224, the privacy manager stores audio data at a mobile client device that received the spoken utterance. Thus, the audio data is stored at a recording device itself, such as a smart phone.

In step 226, the privacy manager stores audio waveform files and corresponding transcriptions. The transcription can be received from a third-party server, or generated from a first-party device. The adaptation data being in a format that prevents reconstruction can include being in a format that prevents reconstruction of the corresponding transcriptions (and/or audio/waveform files) by human or by machine. Also, the adaptation data being in a format that prevents reconstruction can include the adaptation data being in a format that is not readable by human or machine. This means that any original messages, wording, numbers, text, and so forth are not readable or decipherable by a human or machine. Of course a system or machine can read or process adaptation data at least to the extent of updating acoustic models or other speech models, as such processing involves identifying relevant statistical data. The adaptation data, however, cannot be analyzed by a conventional system such than an utterance or transcription can be extracted or recreated.

In step 230, the privacy manager creates adaptation data from the audio data via processing at the first-party device. The adaptation data is in a format that prevents reconstruction of the audio data.

In step 232, the privacy manager creates the adaptation data after collecting a predetermined amount of audio data. This can be any amount, though typically a relatively large amount. By way of a non-limiting example, the privacy manager can wait until after collecting 100 utterances, 1000 utterances, or more.

In step 234, the privacy manager derives statistical data from the audio data.

In step 236, the privacy manager creates updated acoustic model data from the audio data or from derived statistical data.

In step 237, the updated acoustic model data is a version of an acoustic model used at the third-party server.

In step 238, the privacy manager processes a subset of the audio data and discards a remaining portion of the audio data. For example, a predetermined or random selection of utterances or parts of utterances can be used for creating adaptation data, which can increase privacy of adaptation data.

In step 240, the privacy manager transmits the adaptation data to a third-party server.

In step 242, the privacy manager transmit derived statistical data to a server that aggregates derived statistical data from multiple client devices.

In step 244, the privacy manager transmits the updated acoustic model data to a server that aggregates local acoustic models into a global acoustic model.

In step 246, the privacy manager sends a compressed version of the adaptation data to the third-party server, which can help with any bandwidth constraints.

In step 248, the privacy manager sends an encrypted version of the adaptation data to the third-party server.

Continuing with FIG. 5, the following discussion provides a basic embodiment indicating how to carry out functionality associated with the privacy manager 140 as discussed above. It should be noted, however, that the actual configuration for carrying out the privacy manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145. Communications interface 145 can optionally receive input from any number of different types of devices.

I/O interface 144 provides connectivity to peripheral devices such as input devices 135 including a computer mouse, a keyboard, a selection tool to move a cursor, display screen, etc.

Communications interface 145 enables the privacy manager 140 of computer system 149 to communicate over a network and, if necessary, retrieve any data required to create views, process content, communicate with a user, etc. according to embodiments herein.

As shown, memory system 141 is encoded with privacy manager 140-1 that supports functionality as discussed above and as discussed further below. Privacy manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the privacy manager 140-1. Execution of the privacy manager 140-1 produces processing functionality in privacy manager process 140-2. In other words, the privacy manager process 140-2 represents one or more portions of the privacy manager 140 performing within or upon the processor 142 in the computer system 149.

It should be noted that, in addition to the privacy manager process 140-2 that carries out method operations as discussed herein, other embodiments herein include the privacy manager 140-1 itself (i.e., the un-executed or non-performing logic instructions and/or data). The privacy manager 140-1 may be stored on a non-transitory, tangible computer-readable storage medium including computer readable storage media such as floppy disk, hard disk, optical medium, etc. According to other embodiments, the privacy manager 140-1 can also be stored in a memory type system such as in firmware, read only memory (ROM), or, as in this example, as executable code within the memory system 141.

In addition to these embodiments, it should also be noted that other embodiments herein include the execution of the privacy manager 140-1 in processor 142 as the privacy manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing descriptions of embodiments of the invention are not intended to be limiting. Rather, any limitations to embodiments of the invention are presented in the following claims.

The invention claimed is:

1. A computer-implemented method of speech recognition processing, the computer-implemented method comprising:
    receiving a spoken utterance;
    storing audio data from the spoken utterance at a first device;
    creating adaptation data for updating at least one acoustic model, the adaptation data being created from the audio data via processing at the first device, the adaptation data being in a format that hinders reconstruction of the audio data; and
    transmitting the adaptation data to a second device for processing.

2. The computer-implemented method of claim 1, wherein creating the adaptation data occurs after collecting a predetermined amount of audio data.

3. The computer-implemented method of claim 1, wherein creating the adaptation data includes deriving statistical data from the audio data.

4. The computer-implemented method of claim 3, wherein transmitting the adaptation data includes transmitting derived statistical data to a server that aggregates derived statistical data from multiple client devices.

5. The computer-implemented method of claim 1, wherein creating the adaptation data includes creating updated acoustic model data.

6. The computer-implemented method of claim 5, wherein transmitting the adaptation data includes transmitting the updated acoustic model data to a server that aggregates local acoustic models into a global acoustic model.

7. The computer-implemented method of claim 5, wherein the updated acoustic model data is a version of an acoustic model used at the second device.

8. The computer-implemented method of claim 1, wherein creating the adaptation data from the audio data includes processing a subset of the audio data and discarding a remaining portion of the audio data.

9. The computer-implemented method of claim 1, wherein storing audio data at the first device includes storing audio data at a computer that is in network communication with a mobile device that received the spoken utterance.

10. The computer-implemented method of claim 1, wherein storing audio data at the first device includes storing audio data at a mobile device that received the spoken utterance.

11. The computer-implemented method of claim 1, wherein storing audio data from the spoken utterance includes storing audio waveform files and corresponding transcriptions; and wherein the adaptation data is in a format that hinders reconstruction of the corresponding transcriptions by human or machine, and hinders reconstruction of the corresponding waveform files by human or machine.

12. The computer-implemented method of claim 1, wherein the adaptation data is in a format that is not readable by human or machine.

13. The computer-implemented method of claim 1, wherein receiving the spoken utterance includes receiving a voice command or voice query at a mobile device.

14. The computer-implemented method of claim 1, wherein transmitting the adaptation data includes sending a compressed version of the adaptation data to the second device.

15. The computer-implemented method of claim 1, wherein transmitting the adaptation data includes sending an encrypted version of the adaptation data to the second device.

16. A system for speech processing, the system comprising:

a processor; and a memory coupled to the processor, the memory storing instructions that, when executed by the processor, cause the system to perform the operations of:

receiving a spoken utterance;

storing audio data from the spoken utterance at a first device;

creating adaptation data for updating at least one acoustic model, the adaptation data being created from the audio data via processing at the first device, the adaptation data being in a format that hinders reconstruction of the audio data; and transmitting the adaptation data to a second device for processing.

17. The system of claim 16, wherein creating the adaptation data occurs after collecting a predetermined amount of audio data.

18. The system of claim 16, wherein creating the adaptation data includes deriving statistical data from the audio data, and wherein transmitting the adaptation data includes transmitting derived statistical data to a server that aggregates derived statistical data from multiple client devices.

19. The system of claim 16, wherein creating the adaptation data includes creating updated acoustic model data, and wherein transmitting the adaptation data includes transmitting the updated acoustic model data to a server that aggregates local acoustic models into a global acoustic model.

20. A computer program product including a non-transitory computer-storage medium having instructions stored thereon for processing data information, such that the instructions, when carried out by a processing device, cause the processing device to perform the operations of:

receiving a spoken utterance;

storing audio data from the spoken utterance at a first device;

creating adaptation data for updating at least one acoustic model, the adaptation data being created from the audio data via processing at the first device, the adaptation data being in a format that hinders reconstruction of the audio data; and transmitting the adaptation data to a second device for processing.

* * * * *